(12) United States Patent
Klenske (10) Patent No.: US 7,769,640 B2
(45) Date of Patent: Aug. 3, 2010

(54) STRATEGIES FOR ONLINE MARKETPLACE SALES CHANNELS (75) Inventor: Greg Klenske, San Francisco, CA (US)

(73) Assignee: Accenture Global Services GmbH, Schaffausen (CH)

(*) Notice: Subject to any disclaimer, the term of this patent is extended or adjusted under 35 U.S.C. 154(b) by 1600 days.

(21) Appl. No.: 10/794,583

(22) Filed: Mar. 5, 2004

(65) Prior Publication Data
US 2005/0197909 A1 Sep. 8, 2005

(51) Int. Cl.
G06Q 30/00 (2006.01)

(52) U.S. Cl. .............. 705/26; 705/7; 705/10; 705/14; 705/22; 705/37; 705/28; 705/35

(58) Field of Classification Search .......... 705/26
See application file for complete search history.

(56) References Cited

U.S. PATENT DOCUMENTS

| | | | |
|---|---|---|---|
| 5,424,944 A | 6/1995 | Kelly et al. |
| 5,664,111 A | 9/1997 | Nahan et al. |
| 5,845,265 A | 12/1998 | Woolston |
| 5,946,662 A | 8/1999 | Ettl et al. |
| 5,960,411 A | 9/1999 | Hartman et al. |
| 6,029,141 A | 2/2000 | Bezos et al. |
| 6,035,288 A | 3/2000 | Solomon |
| 6,041,308 A | 3/2000 | Walker et al. |
| 6,058,417 A | 5/2000 | Hess et al. |
| 6,064,980 A | 5/2000 | Jacobi et al. |
| 6,085,169 A | 7/2000 | Walker et al. |
| 6,085,176 A | 7/2000 | Woolston |
| 6,202,051 B1 | 3/2001 | Woolston |
| 6,266,649 B1 | 7/2001 | Linden et al. |
| 6,317,722 B1 | 11/2001 | Jacobi et al. |
| 6,343,273 B1 | 1/2002 | Nahan et al. |
| 6,356,878 B1 | 3/2002 | Walker et al. |
| 6,415,320 B1 | 7/2002 | Hess et al. |
| 6,466,917 B1 | 10/2002 | Goyal et al. |
| 6,466,918 B1 | 10/2002 | Spiegel et al. |
| 6,484,153 B1 | 11/2002 | Walker et al. |
| 6,523,037 B1 | 2/2003 | Monahan et al. |
| 6,553,346 B1 | 4/2003 | Walker et al. |

(Continued)

OTHER PUBLICATIONS

Bapna, Ravi. "Economic and Experimental Analysis and Design of Auction-Based Online Mercantile Processes." Dissertation Abstracts International. vol. 60/08-A. p. 3000, 1999.*

(Continued)

Primary Examiner—F. Zeender
Assistant Examiner—Fawaad Haider
(74) Attorney, Agent, or Firm—Fish & Richardson P.C.

(57) ABSTRACT

In an online marketplace environment, a connection provider can provide various strategies to a seller of items on one or more online sales channels. In one implementation, a method for selling one or more items on an online sales channel includes measuring product activity on the online sales channel and assessing an average selling price for the one or more items. The method includes comparing a target recovery price for the one or more items for sale with the average selling price and adjusting one or more selling factors to cause the average selling price to approach or exceed the target recovery price. The one or more auction factors can be adjusted to affect product activity on the online sales channel.

27 Claims, 6 Drawing Sheets

U.S. PATENT DOCUMENTS

| | | | |
|---|---|---|---|
| 6,604,107 | B1 | 8/2003 | Wang |
| 7,249,059 | B2 | 7/2007 | Dean et al. |
| 7,359,871 | B1* | 4/2008 | Paasche et al. ............... 705/26 |
| 7,440,908 | B2 | 10/2008 | Snapp et al. |
| 2001/0037245 | A1 | 11/2001 | Ranganath et al. |
| 2002/0023004 | A1 | 2/2002 | Hollander et al. |
| 2002/0032597 | A1 | 3/2002 | Chanos |
| 2002/0099678 | A1 | 7/2002 | Albright et al. |
| 2002/0116302 | A1 | 8/2002 | Wilmes et al. |
| 2002/0156685 | A1 | 10/2002 | Ehrlich et al. |
| 2002/0169640 | A1 | 11/2002 | Freeland |
| 2002/0169658 | A1* | 11/2002 | Adler ........................ 705/10 |
| 2002/0169676 | A1 | 11/2002 | Floyd |
| 2003/0014350 | A1 | 1/2003 | Duell et al. |
| 2003/0033205 | A1 | 2/2003 | Nowers et al. |
| 2003/0154134 | A1 | 8/2003 | Wang |
| 2004/0015415 | A1 | 1/2004 | Cofino et al. |
| 2004/0039680 | A1* | 2/2004 | Horch et al. ................. 705/37 |
| 2005/0033648 | A1 | 2/2005 | Jin et al. |
| 2005/0055281 | A1 | 3/2005 | Williams |
| 2005/0171858 | A1 | 8/2005 | Cotton et al. |
| 2005/0197909 | A1 | 9/2005 | Klenske |
| 2005/0197946 | A1 | 9/2005 | Williams et al. |
| 2005/0203804 | A1 | 9/2005 | Suzuki |
| 2006/0190352 | A1 | 8/2006 | Zeidman |
| 2008/0262865 | A1 | 10/2008 | Cotton et al. |

OTHER PUBLICATIONS

Jabil Circuit, "Jabil Global Services", http://www.jabil.com/1048.asp May 28, 2004.

Jabil Circuit, "Returns", http://www.jabil.com/1037.asp, May 28, 2004.

Andale, "Smart Tools and Services to Help you Sell on eBay", http://www.andale.com/corp/products/products.jsp May 28, 2004.

Andale, "Sales Analyzer", http://www.andale.com/rep/rep_quickstart.jsp?foo=4379&resetStoresNav=y May 28, 2004.

"eBay", http://www.accenture.com/xd/xd.asp?it=enWeb&xd=industries/communications/alliances.

Troy Wolverton, "eBay-Accenture deal aimed at big guns", Cnet News.com, May 7, 2002; http://news.com/2100-1017-901190.html?tag=n1.

Troy Wolverton, "Accenture connects to eBay", Cnet News.com, Oct. 23, 2002; http://news.com/2102-1017-963086.html.

"Improving Inventory Turn and Value Online: What is your eBay Strategy?" A Connection to eBay White Paper, Apr. 2003.

"Operating Agreement", Amazon.com, http://affiliate-program.amazon.com/gp/associates/agreement/ref—amb_link_517882_10/103-5314425-4118200?pf_rd_m=ATVP.

Participation Agreement, http://amazon.com/gp/help/customer/display.html/002-5582521-1516869?ie—UTF8&nodeId=1161302&qid=1184600773&sr=2-1, (1 of 7), Jul. 16, 2007, 12:50:26 PM.

Priceline.com Incorporated Web Site Terms & Conditions, Agreement between User and priceline.com Incorporated, http://www.priceline.com/customerservice/faq/ShowHelp.asp?faq=ext(AIRPOP_TERMS), (1 of 20), Jul. 16, 2007, 12:49:36 PM.

Accenture: "eBay, Accenture to link consumers to manufacturer' and retailers' inventories," Electronic Commerce New, May 13, 2002, v7i10pg1, Proquest #119400039, 3pgs.

Amazon: "Amazon.com Auctions Helps Online Sellers Become Effective Mailceters," PR Newswire, Aug. 18, 1999, Proquest #44014963, 4pgs.

Andale "Andale 2003 Einstein Product Showcase", downloaded from the internet at http://presstours.andale.com/search.html on Jul. 1, 2003, 10 pages.

Anderson, USPTO Office Action in U.S. Appl. No. 10/794,769 dated Nov. 30, 2007, 24 Pages, to be published by USPTO with the file history of this application.

Anderson, USPTO Office Action in U.S. Appl. No. 10/794,769 dated Jun. 25, 2008, 26 Pages, to be published by USPTO with the file history of this application.

Buterin, "Top Dog Sales Strategy", Purple Squirrel, Oct. 2001, downloaded from the internet at http://www.purplesquirrel.com/articles/2001/oct/buterin.shtml on Dec. 31, 2003, 3 pages.

Connection to eBay; "eBay and Accenture unveil new service . . . ," Business Wire, May 7, 2002; Proquest #1181166491, 3 pgs.

Dunham, USPTO Office Action in U.S. Appl. No. 10/797,906 dated Jan. 8, 2007, 12 Pages, to be published by USPTO with the file history of this application.

Dunham, USPTO Office Action in U.S. Appl. No. 10/797,906 dated Jun. 20, 2007, 11 Pages, to be published by USPTO with the file history of this application.

Dunham, USPTO Office Action in U.S. Appl. No. 10/797,906 dated Sep. 22, 2008, 14 Pages, to be published by USPTO with the file history of this application.

Dunham, USPTO Office Action in U.S. Appl. No. 10/797,906 dated Mar. 26, 2009, 11 Pages, to be published by USPTO with the file history of this application.

Dunham, USPTO Office Action in U.S. Appl. No. 10/797,906 dated Jul. 23, 2009, 10 Pages, to be published by USPTO with the file history of this application.

Haq, USPTO Office Action in U.S. Appl. No. 10/808,730 dated Jan. 9, 2007, 7 Pages, to be published by USPTO with the file history of this application.

Haq, USPTO Office Action in U.S. Appl. No. 10/808,730 dated May 1, 2007, 8 Pages, to be published by USPTO with the file history of this application.

Haq, USPTO Office Action in U.S. Appl. No. 10/808,730 dated Oct. 16, 2007, 19 Pages, to be published by USPTO with the file history of this application.

Haq, USPTO Office Action in U.S. Appl. No. 10/808,730 dated Jul. 17, 2008, 10 Pages, to be published by USPTO with the file history of this application.

Keefe, Collin; "Where haves meet wants," Dealerscope, Jan. 2002; v44i1 ,p. 50; Proquest #988243388, 9 pgs.

Pond, USPTO Office Action in U.S. Appl. No. 10/658,671 dated May 2, 2008, 16 Pages, to be published by USPTO with the file history of this application.

Pond, USPTO Office Action in U.S. Appl. No. 10/658,671 dated Dec. 12, 2008, 14 Pages, to be published by USPTO with the file history of this application.

Pond, USPTO Office Action in U.S. Appl. No. 10/658,671 dated May 13, 2009, 10 Pages, to be published by USPTO with the file history of this application.

* cited by examiner

STRATEGIES FOR ONLINE MARKETPLACE SALES CHANNELS

CROSS-REFERENCE TO CO-PENDING APPLICATIONS

This application is a co-pending application with U.S. patent application Ser. No. 10/794,769 filed Mar. 5, 2004.

BACKGROUND

The following description relates to strategies for online marketplace sale channels, for example, identifying and implementing certain "best practices" that enable sellers of property or merchandise to sell goods or items through an online sales channel in an optimal manner. An online sales channel, such as an online marketplace, can provide any of several different avenues for selling goods or items online. Such avenues include, for example, fixed-price selling and/or an online auction, such as provided at www.ebay.com, which occurs via one or more web sites in which people and organizations from around the world can buy and sell goods and/or services. Among other goods and services, collectibles, books, jewelry, appliances, computers, tickets, sporting goods, furniture, equipment, vehicles, and vacation packages are listed on online marketplace web sites, and bought and sold daily through the online marketplace sales channels.

Participants in online marketplaces may include individuals, small companies, large corporations, or other types of organizations. In general, the term "organization" may refer to a company, enterprise, business, government, educational institution, or the like. The term "organization" can also refer to a group of persons, such as an association or society.

Some participants in online marketplaces may have business-to-business (B2B) relationships with other participants that may tend to focus on a vertical market, such as healthcare or automotive. Participants in a B2B marketplace can liquidate unwanted capital assets, dispose of excess inventory, and buy or sell equipment, goods, and services. Other participants in online marketplaces may have business-to-consumer (B2C) or consumer-to-business (C2B) relationships. A business may sell goods and services to the consumer market in a B2C online marketplace. Other participants may have consumer-to-consumer (C2C) relationships, in which individuals can buy and sell goods and services to/from other individuals.

One such online marketplace, eBay Inc. of San Jose, Calif., provides online services in which buyers and sellers can browse (e.g., navigate), list goods (e.g., post for sale), buy and sell various goods and services in a web-based marketplace. Among other services, eBay provides online auction and listing services, such that eBay typically does not directly handle or own the goods. Instead, eBay can facilitate the listing of the goods and services on its website, and facilitate transactions of trading activities between buyers and sellers. Among other operations, eBay can provide listing features, a dynamic pricing structure, a presentation of items with digital photographs, a formatting of listing information, and the like.

Online auctions offer a dynamic pricing structure where buyers can compete for the goods and services. More generally, an online marketplace can provide flexible selling features to allow sellers to use different selling formats (e.g., fixed-price or auction), multiple product categories, various auction start and end dates, different branding and listing approaches, and multiple pricing formats, including different types of auctions. Some of the various types of auctions may include normal, Dutch, reverse, lots, and others. In a dutch auction, for example, a seller may offer multiple copies of the same item, and the winning bidders pay the amount of the lowest winning bid. In a reverse auction, sellers can bid against each other to win a buyer's business. For example, Priceline.com Inc. of Norwalk, Conn. sells airline tickets, hotel rooms, and additional products based on the price the consumer is willing to pay.

As noted above, an online marketplace also may provide a fixed-priced format for selling goods and services. For example, the online marketplaces of eBay, Amazon.com, Inc. of Seattle Wash. and Buy.com, Inc. of Aliso Viejo, Calif. provide fixed-priced selling, in which the seller offers goods at a fixed, predetermined price. The price of the good may be a factor of the Manufacturer's Suggested Retail Price (MSRP), and/or the price of the same good from other sellers.

Online marketplaces represent a sales channel—that is, an avenue for selling goods or services—that has become popular only recently. More traditional sales channels include "brick-and-mortar" storefronts, for example, a department store in which a good (e.g., a shirt) can be sold to buyers of the good. Other sales channels include catalog sales, door-to-door sales, and telemarketing sales. A seller may use multiple sales channels to sell its goods or services—e.g., retail stores and an online sale channel such as a web site with similar product offerings. In the case of an online sales channel, a seller either may set-up and maintain its own dedicated web-site that sells only its own merchandise or may use an online marketplace web-site (e.g. eBay, Amazom.com or Buy.com) that sells merchandise owned by several different sellers. As used herein, "online sales channel" encompasses both dedicated, single-seller online sales channels as well as multiple-seller online sales channels.

SUMMARY

In one implementation, a method of facilitating sales through an online marketplace sales channel involves generating a selling strategy designed to recover at least a target price for one or more items offered for sale through one or more online sales channels. The strategy is generated by selecting a set of one or more selling practices from among a number of selling practices, and the method includes facilitating a sale of the items through the one or more online sales channels based on the generated selling strategy. The method also includes selectively fine-tuning the strategy based on sales performance. The selling practices may include assessing one or more factors relevant to the sale of the one or more items.

One or more factors can affect bidding or sales activity at an online auction or a fixed-priced marketplace. The factors may include keywords determined by a connection provider, a brand of the item, feedback from customers of the one or more online sales channels, warranty offers from the seller, and a level of detail of a description of the item being sold, such as an image of the item. The factors may also include a pricing strategy for the item being sold, a duration of the online auction, a day of the week the online auction ends, a time of the day the auction ends. Another factor may include an auction type such as a dynamic pricing-type auction, a Chinese auction, a fixed price auction, a $1 no reserve auction, a normal auction, a Dutch auction, and a reverse auction. Other factors may include a quantity of the item being sold and various listing features, as well as the bolding of text, highlighting of text, and pictures.

In selectively fine-tuning the selling strategy, the method may also involve performing an analysis on the sales performance of one or more items sold through the one or more online sales channels, and adjusting the selling strategy based on a sales performance and/or any one or more of the factors. The analysis on the sales can include assessing a recovery rate, an average selling price, a net merchandise sales (NMS), a gross merchandise sales (GMS), and fees and costs of selling the items on the online sales channel.

The method may include adjusting one or more of the factors to increase an average selling price of the items on the online sales channel. The listing volume on the online sales channel may be varied, and/or the starting price of the one or more items for sale may also be varied.

The method may also include classifying a merchant into a "bucket" based on the sales performance. The merchant classification may be changed from a first bucket to a second bucket based on the performance of the sale.

The current disclosure also describes a method for selling one or more items on an online sales channel. The method includes measuring product activity on the online sales channel for the items and assessing an average selling price on the online sales channel for those items. A comparison is made between a target recovery price for the items for sale with the average selling price. One or more selling factors are adjusted in order for the average selling price to approach or exceed the target recovery price, in which adjusting the selling factors affects product activity on the online sales channel. The method may also include soliciting one or more underbidders for second chance offers to buy one or more items related to the sold item.

The method may include one or more strategies for selling the items. One such strategy can include a low velocity strategy that includes a number of auction factors, such as low start prices, medium listing volume, and long listing duration. Another strategy can include a high velocity strategy that adjusts a listing volume of the items for sale to reduce the average selling price to be at an equilibrium with the target recovery price. In adjusting the listing volume, a number of items sold may increase. The high velocity auction strategy can include a number of auction factors, such as high listing volume, short listing duration, and low start prices. Other auction strategies may include a "dog" strategy and a price protection strategy. For example, the price protection strategy can include a number of auction factors, such as low listing volume and/or long listing duration.

In another aspect, a system includes a network of computers that provides auction services for an item being sold on an online sales channel. The system has a database to store information (e.g., a target selling price of the item) for the item being sold from a seller, and a strategy to sell the item on the online sales channel. The strategy is adapted to sell the item at an average selling price that is least at the target selling price of the item. The strategy includes a starting auction price and an item listing volume on the sales channel, in which the strategy is developed by a connection provider. The strategy is adapted to be stored on the database and sent to the online sales channel and/or the seller through the network of computers.

When selling items online, sellers may not have the skill, knowledge, or insight on practices on how to develop or implement strategies to sell their products online. For example, a seller wanting to sell a large inventory of low-priced items (e.g., refurbished inkjet printers) may want to know the "best practices" for moving its product. As used herein, "best practices" refers to one or more techniques or methodologies that, through experience and research, has proven to reliably lead to a desired result. Such best practices may involve, for example, setting an auction start time, duration, opening price, and/or quantity. The seller may also want to know what type of dynamic pricing vehicle to use (e.g., regular auction, Dutch auction, fixed-price sales, lots, etc.), and, when multiple sales channels are available, which online sales channel to use.

The systems and techniques described here may provide one or more of the following advantages. A connection provider (e.g., an intermediary entity between a seller and an online sales channel) can help the seller to develop effective strategies to sell its items online. In particular, the connection provider can help the seller to assess various factors in selling its products (e.g., target prices, auction type, auction duration), and help determine the best strategy (e.g., low velocity strategy) based on the goals of the seller and the nature of the product being sold. Among other things, the connection provider can help the seller to establish realistic target prices, sell a consistent flow of its items, compare its target prices against online market prices, and dynamically track its sales with activities in the online marketplaces. The connection provider may also help the seller to understand an overall performance level (e.g., portfolio level) of auction results, instead of one auction result at a time. Furthermore, the connection provider can help the seller to implement high-risk or low-risk strategies for selling items.

The details of one or more implementations are set forth in the accompanying drawings and the description below. Other features and advantages will be apparent from the description and drawings, and from the claims.

DRAWING DESCRIPTIONS

Like reference symbols in the various drawings may indicate like elements.

DETAILED DESCRIPTION

Figure 1:
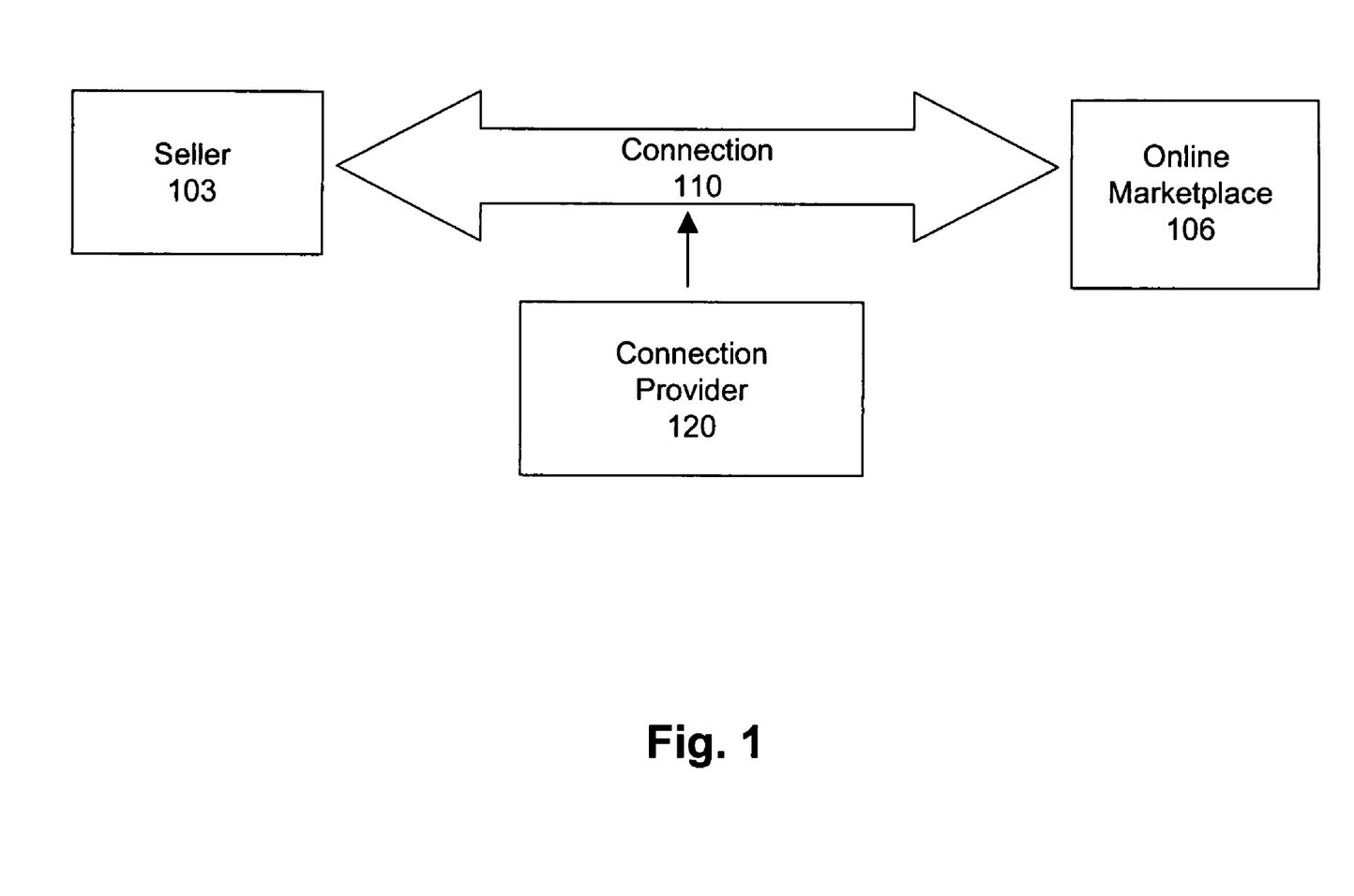
FIG. 1 is a block diagram showing a connection between a seller and an online sales channel.

FIG. 1 is a block diagram showing a connection 110 between a seller 103 and an online marketplace 106. The seller 103 may offer items to sell through the online marketplace sales channel 106. As used herein, "items" can mean goods—whether new, used or refurbished—services, or a combination of goods and services. In one implementation, the seller 103 can employ a connection provider 120 who will facilitate the connection 110 to one or more online marketplaces 106. The online marketplaces 106 may provide a primary or alternative sales channel for the seller 103. The one or more online marketplaces 106 may or may not be owned and/or controlled by the connection provider 120. Typically, the connection provider 120 is a separate legal entity from the online marketplaces 106 to which it provides a connection 110.

Examples of connection providers include Accenture Ltd., ChannelAdvisor Corp. and AuctionWorks, Inc. Examples of sellers include manufacturers, distributors, retailers, corporations, and government entities. In addition, enterprises not ordinarily in the business of selling goods, a services provider, for example, may nevertheless find it beneficial to establish an online sales channel to sell items such as used computer equipment, office furniture, excess supplies and the like. Examples of online sales channels include eBay, Amazon, and Buy.com.

A seller 103 need not. necessarily employ a connection provider 120 to develop an alternative sales channel on the online marketplace 106, but rather may develop the alternative sales channel using its own personnel and resources, for example, by accessing the online sales channel directly and listing its items for sale. Typically, directly listing items for sale on an online sales channel requires an investment of the seller's resources including personnel time, technology, and capital. For example, an automobile parts supplier may hire its own staff and purchase extra computers and software to list, for example, new or refurbished automobile parts on eBay.

Alternatively, the seller 103 may employ a third-party connection provider 120 to develop an alternative sales channel on the online marketplace 106. In that case, the seller 103 need not, for example, hire extra staff, buy additional equipment, or develop the in-house expertise for the alternative sales channel. Rather, the seller 103 can hire the connection provider 120 to outsource the development and maintenance of the alternative sales channel. In hiring the connection provider 120, the seller 103 may form a relationship or an account with the connection provider 120. The connection provider may provide a multitude of services such as customer service, sales or auction strategy, logistics management, and checkout procedures.

The present disclosure describes systems, methods, and techniques in which the connection provider 120 provides one or more services to one or more sellers. The connection provider 120 can provide one or more preferred practices for selective implementation by human strategist(s) for selling a seller's items on an online marketplace sales channel. Online auctions may have one or more factors that can affect the success of the auction (e.g., one or more items sold at or above that seller's target recovery price). Elements of strategy may be SKU specific and may include an auction start time, duration, starting price, quantity, type of dynamic pricing vehicle to use (e.g., regular auction, dutch auction, fixed-price sales, lots, etc.), one or more listing features (e.g., pictures, descriptive item details). Other factors in an online auction, as well as various types of auction strategies are described below. The connection provider can implement one or more strategies to help the seller to sell the one or more items online while achieving a target recovery price for the items. The connection provider can help a seller to achieve one or more sales goals by varying one or more factors to adjust an average selling price and/or a number of units sold on an online sales channel.

The seller can supply information about the items being sold to the connection provider—for example, in the form of an electronic document such as a Product Data File (PDF)—and the connection provider can use this information to arrange for the items to be sold on an online marketplace. The connection provider can use the information in the PDF to help determine an auction strategy for the seller. For example, the connection provider may help to arrange or categorize items for sale based on keyword identifications. When a buyer searches for items to purchase, the keyword(s) determined by the connection provider and the seller may give the items for sale greater visibility than if the seller alone had determined the keyword(s). For example, a seller may try to sell a computer textbook, and would normally provide a title, author, and year of the textbook for sale. However, the connection provider may also include an International Standard Book Number (ISBN), links identifying other books from the same author, the type of computer textbook (e.g., a microprocessor textbook), and a list of other keywords that a potential buyer may use to search for the item for sale. The connection provider may also specify that the online marketplace use unique and/or bold font and/or colors for the text of the listing to make the listing stand out from other items for sale.

Figure 2:
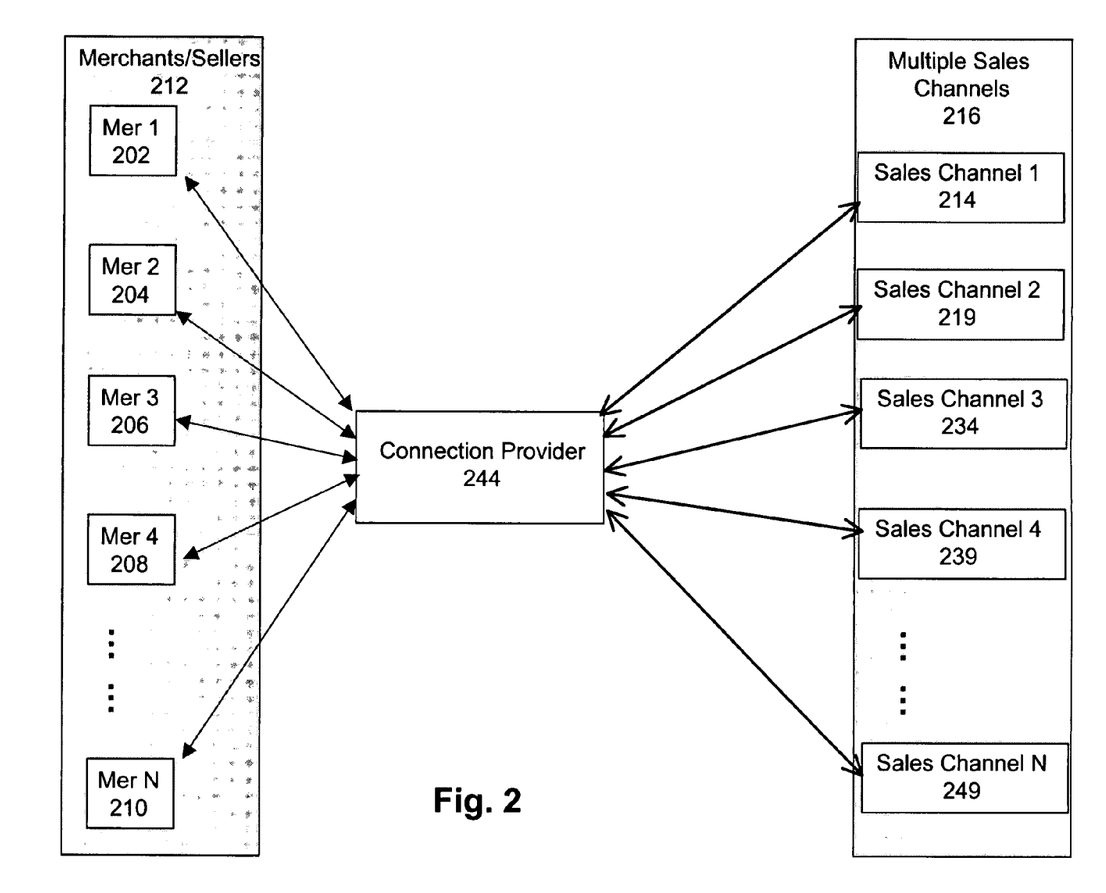
FIG. 2 is a block diagram of a connection architecture.

FIG. 2 is a block diagram of a connection architecture in which a connection provider 244 facilitates the access (e.g., connection) of one or more merchants/sellers 212 to one or more online sales channels 216. The connection provider 244 may receive information from a seller 212, in which the information describes one or more items for sale by the seller. The connection provider 244 may facilitate a sale of the item through one or more online sales channels 214. The connection provider 244 may also facilitate fulfillment of the item for sale with a fulfillment center (not shown). In a typical implementation, the connection provider 244 can provide a software infrastructure (e.g., data communications, order management integration, and user interface capabilities) that enables a merchant/seller 212 to provide information describing one or more items to be sold on an online sale channel. The connection provider 244 may then list the items for sale on one or more online sales channels 216 and, depending on the level of service selected by the seller/merchant 212, can fulfill an order (that is, a consummated sale) of an item using a fulfillment center.

The connection provider 244 may be an intermediary that facilitates access to one or more online sales channels 216 and which neither takes title and/or possession of the items being sold. The merchants 212 may include small businesses, large companies, organizations, individuals, or other entities selling an item. The online sales channels 216 may include multiple web sites or marketplaces listing the items being sold. Alternatively, one or more of the online sales channels may be operated or controlled by the connection provider 244.

The merchants 212 may offer various items for sale with different properties, characteristics or requirements. The merchant 212 can send information to and receive information from the connection provider 244. The sent information may include details and descriptions on the items for sales and any relevant parameters related to those items. The merchant can send the information to the connection provider, and the merchant may elect to have the connection provider coordinate all or part of the auction strategy.

In the implementation shown in FIG. 2, the information sent from the merchant 212 to the connection provider 244 may be a PDF delineating the items at the SKU level. The PDF may be in a tabular format, and may include data fields with detailed item information. Alternatively, the information sent from a merchant 212 to the connection provider 244 may include metadata or an eXtensible Markup Language (XML) object with one or more parameters of the items being sold. Instead of, or in addition to an XML object, the information sent from the merchant may include two or more objects, with one object containing information for the items being sold, and another object with information regarding one or more parameters. The term "object" may refer to information sources such as documents, reports, presentations, files and directories. In another implementation, the connection provider 244 may also provide a dedicated portal interface to merchants, in which a merchant can transmit information through the portal to the connection provider in a secure, pre-determined format.

The connection provider (e.g., Accenture) 244 may provide a broad range of sales channel facilitation services, such as billing services, collection services, advertisements, strategic sales services, and customer service. The customer service capabilities may include a tool to interface with a buyer, in which the customer service tool may present contact information and policies for the connection provider and online sales channel. Other sales channel facilitation services may include inventory management, transportation management, order management, store design, and listing tools. The listing tools can include providing descriptions, categories, keywords, titles, and scheduling for the items being sold. The listing tools can include pictures and descriptions of the items being sold, and merchandise products and categories on the storefront. The connection provider can provide information about the seller, which can include a presentation of ratings of the seller from other previous buyers to provide post-transaction feedback. Potential buyers can examine the seller's feedback profile before bidding to rate the seller's items and trustworthiness.

The connection provider 244 can monitor a progress of the selling performance of the items. The connection provider 244 also can provide online auction capabilities and the ability to monitor auctions as they progress. The connection provider can help the merchant to formulate auction strategies based upon the merchant and/or the items being sold. For example, the connection provider 244 can suggest an auction duration period (e.g., 7 days), pricing (e.g., $10), and start and end times (e.g., 1 pm EST from one Friday to the following Friday) for the auction. The connection provider 244 also can provide various types of auctions, such as Dutch, Chinese, Buy-it-Now (BIN), Large Lot, and Fixed Price. For example, a Chinese auction (a.k.a. "penny auction" or "silent auction") can refer to a fund raising event in which participants barter tickets for any manner of prizes or items. The items may be from one or more auction members or providers and may be donated for the purposes of raising money at the auction.

Figure 3A:
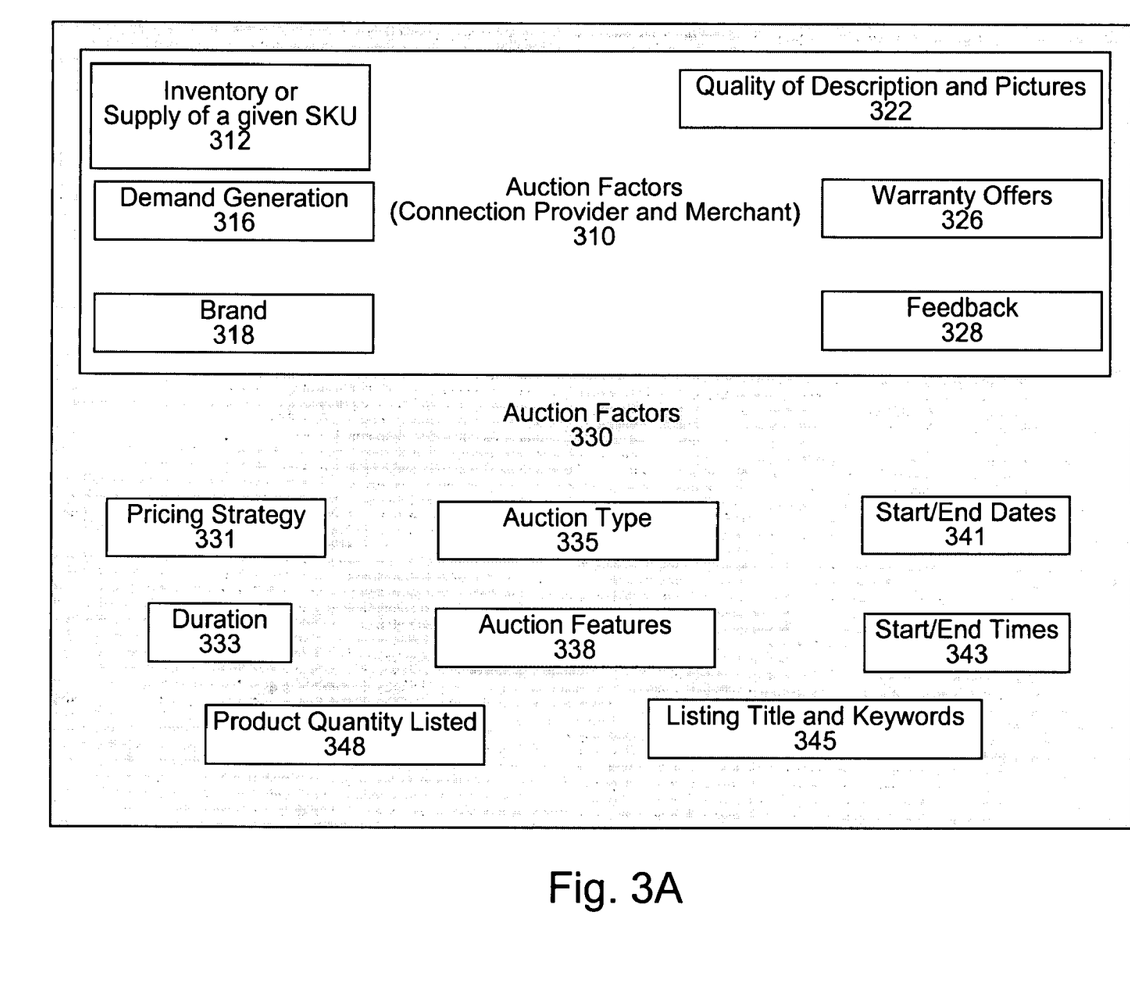
FIGS. 3A-3B show block diagrams illustrating possible factors in an auction.
Figure 3B:
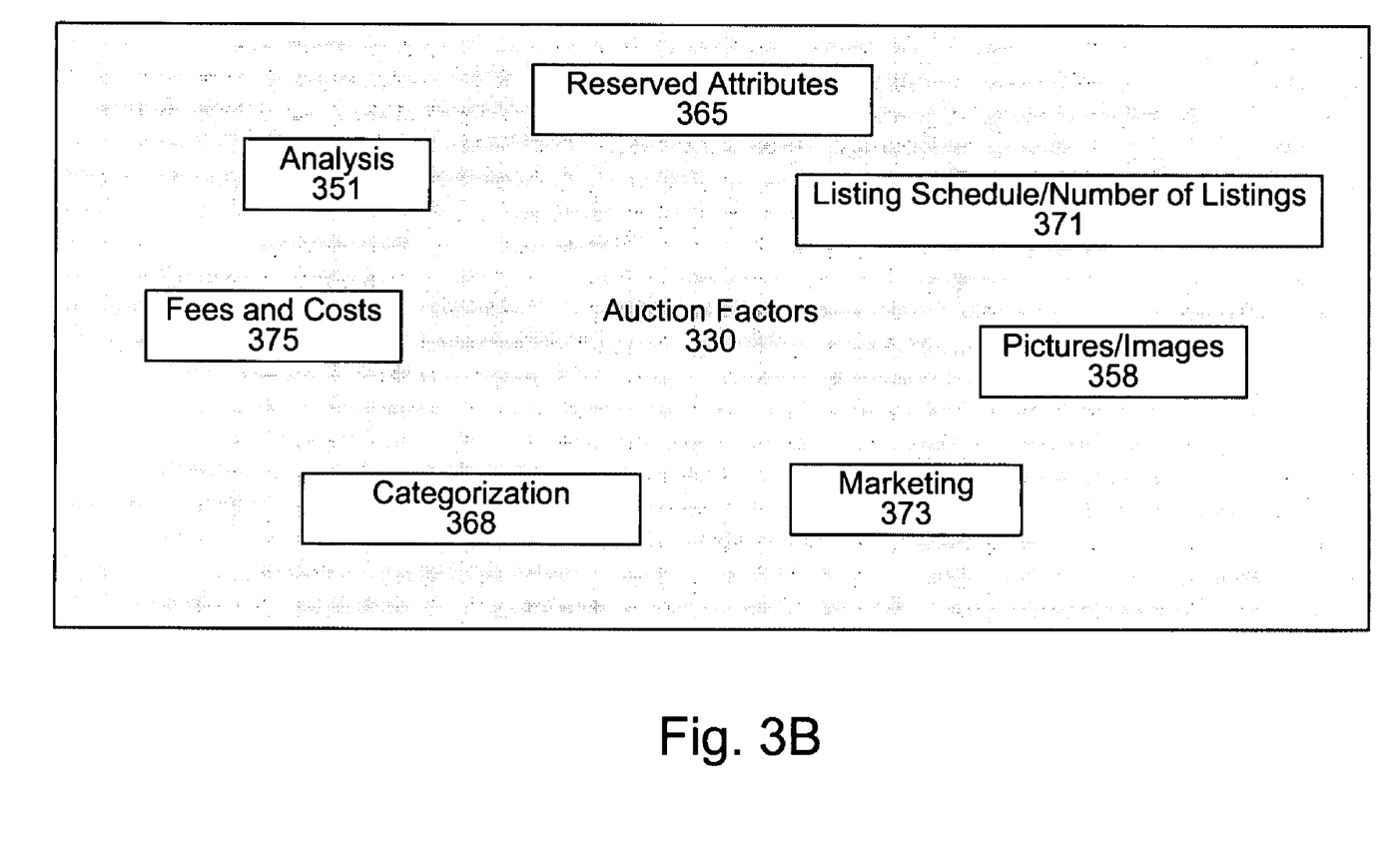

FIGS. 3A and 3B show various factors in generating, providing, and managing an online auction. The factors shown may influence the result of an auction such as the selling price of the item(s) and the number of items sold. The factors within block 310 (e.g., inventory 319) can represent the factors that are determined, both in part, by the connection provider and the merchant. The factors outside block 310 (e.g., listing title and keywords 345) can include the factors that are determined or handled primarily by the connection provider.

In block 310, the seller can influence closing prices and inventory levels by increasing (or decreasing) a number of auctions for a particular type of item or item SKU (block 312). The connection provider may have an account manager to help generate demand (block 316) for the items for sale by attracting target audiences and driving traffic to the seller's listings to increase bidding activity. The account manager may also help the seller to generate demand by seeking new customers, identifying and selling from the seller's various business units (e.g., cross-merchandising), and selling items in wholesale lots (e.g., a sale of a group of items). The connection provider can help the seller to sell items based on the strength of the brand (block 318). The strength of the brand (block 318) can influence merchandising strategies (e.g., promotions) and bidding activity.

The quality of the description of the item for sell, along with pictures (block 322), can provide a buyer with an adequate understanding of the item they seek to purchase. Detailed descriptions can have a benefit of reducing the likelihood of servicing one or more questions from the customer. The seller can send detailed descriptions to the connection provider in the PDF. Detailed descriptions may include the type of item, the condition of the item (e.g., new, used, refurbished), the SKU, the MSRP, the shipping costs, and the key features and specifications of the item. The buyer may have increased confidence in the item for sale if the seller offers a warranty (block 326). A warranty offer can increase bidding activity and an average selling price (ASP). Also, customer feedback (block 328) can impact the average selling price. The customer feedback (block 328) may refer to a rating from customers (e.g., two stars out of five stars), a number of customer reviews (e.g., 1348 customer reviews for the seller), and/or customer comments (e.g., "The item arrived 1 week late and it was in poor condition").

Among other factors, timing factors can impact the auction. For example, the pricing strategy (block 331) can impact bidding activity (e.g., the lower the starting price, the higher the number of initial bids), and the duration (e.g., 3, 5, or 7 days) can influence if most or all of the inventory is sold in that time period. The pricing strategy (block 331) can include parameters such as the starting price for an item, a type of selling strategy, and whether the item will be dynamically priced (e.g., an auction) or statically priced (e.g., fixed-priced sale). The day of the week (block 341) and the time of day (block 343) the auction starts and ends can influence the average selling prices and determine if an item actually sells. For example, an auction for an item that ends in the early morning (e.g., 2 am PST) on a weekend may not generate enough final-hour bids to allow the seller to fully recover its costs for the item being sold. Auction timing may also be important to the seller's strategy when a seller wants to auction one or more items before an end of a seasonal quarter (e.g., summer clothes) or before a holiday (e.g., Halloween costumes).

The type of auction (e.g., Chinese, Fixed Priced, Buy It Now, Store Listing etc.) (block 335) can impact velocity (e.g., how quickly one or more items are sold) and/or price recovery strategies. In addition to the types of auctions discussed above, a $1 NR auction is a type of auction with a $1 start price and no reserve option for the item up for bidding. This type of auction can be used to determine a value of the item when information is not readily available to determine an asking price. The $1 NR style auction can be used when implementing a low to high velocity strategy when a product's average selling price (ASP) is higher than the seller's target price. If the item has a value greater than $1, the $1 NR style of auction may also be used as a promotional tool to draw bidders to the listing.

Different auction features (block 338) may be used to merchandise items. Auction features may involve the actual presentation of listing the items on the online sales channels, such as bolding and/or highlighting text, and using a galley of pictures (block 358) for the item being sold (e.g., 3 dimensional images). Some auction features, such as bolding and highlighting text of listings, can bring additional bidders to an item and/or increase the average selling price. The connection provider may charge an additional fee for the auction features. The listing of titles and using keywords to identify items (block 345) can impact bidding activity and influence visibility of the listings on the sales channels. The listing of titles may relate to a field in the PDF, as well as a short description (e.g., keywords) of what a buyer may enter in a search box on the online sales channel.

The quantity of the item listed (block 348) can be a factor in auctions as well. For example, a connection provider's auction strategist may only list a quantity of "1" for a fixed priced auction or Chinese auction that performs poorly. Reducing a number of listed quantities for poor selling items may reduce the seller's costs of trying to sell items on the online sales channel.

As shown in FIG. 3B, the items may be grouped into categories (block 368) for the items for sale, and may also be grouped into online store categories (for a sales channel with multiple stores). An auction strategist may perform an analysis (block 351) of the performance of sales of one or more items for a seller and may alter selling strategy (e.g., try different keywords, vary the starting price, and sell multiple units at a time). The analysis may involve assessing recovery rates, costs, average selling prices (ASP), total net merchandise sales (NMS), total gross merchandise sales (GMS), and the like. Some sellers may be particularly sensitive to the fees and costs of selling on the online sales channels. Such fees and costs can reduce the seller's recovery. The auction strategist may devise a strategy to help minimize the seller's fees and costs (block 375), and may recommend that the seller provide pictures and images (block 358) of the items for sale. The auction strategist may also recommend for a seller to "flood" the online sales channels with listings (block 371) to help the seller to attract bidders, increase sales, and/or grow NMS. The connection provider may also have a marketing agent to help the seller to increase the target price and market items (block 373) on the online sales channels via advertisements, promotions, and discounts to certain customers (e.g., repeat customers, first-time customers).

Figure 4:
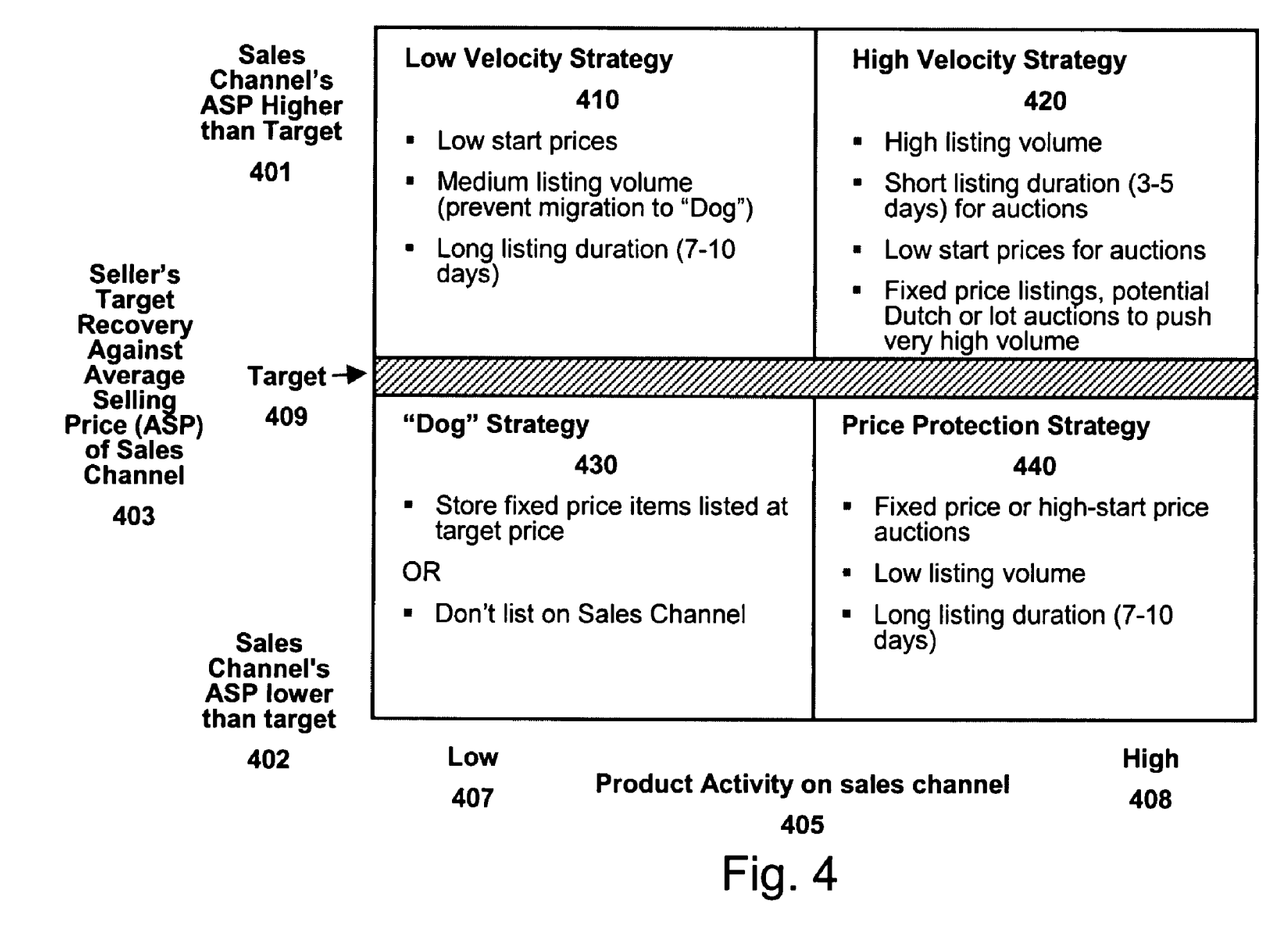
FIG. 4 illustrates auction strategies.

FIG. 4 shows several strategies that can be used in an online auction. In particular, FIG. 4 shows a matrix of auction strategies that the connection provider can determine for a seller based on the seller's goals, the nature of the items for sale, and the quantity of the items. The horizontal axis 405 shows a measure of the product activity on a sales channel. The product activity can refer to how quickly items are sold on the online sales channels from when those items are first listed on the sales channel. The product activity can also refer to a number of items that are sold on a sales channel (e.g., 223 sold out of 250 listed) in a given time frame (e.g., 7 days), or it may refer to the bidding activity for an item. The left side represents low product activity 407 and the right side represents high product activity 408. The vertical axis 403 represents a seller's target recovery in reference the item's average selling price (ASP) on a sales channel. The middle section of the vertical axis in FIG. 4 represents the target recovery 409 price that the seller can specify for an item. The target price may represent a price that will allow the seller to at least recover costs from selling the item on the sales channels. The costs may include the price of the item itself, as well as the costs and fees for selling the item online. The section of the diagram above the target price (section 401) can indicate a case when the sales channel's ASP is higher than the target price. In the upper section of the diagram (section 401), the seller can recover more than the target price of the item for sale. In the lower portion of the diagram (section 402), the sale's channel ASP is lower than the target. In the lower portion (section 402), the item may not be selling well on the sales channel and/or the item may not be suitable for selling on the online sales channel.

The target price may also be determined based on the prices of sales channels that are not associated with the connection provider. The alternative sales channels provide the merchants with the Next Best Alternative (NBA) to the sales channels of the connection provider. For example, the NBA sales channel may represent a traditional liquidator. The connection provider may provide merchants with higher sales margins than the NBA sales channel. For example, the target price may be determined as the price of a NBA plus fees (e.g., channel fees, eBay fees, C2E fees) plus a sales margin (typically between 5% and 20%).

FIG. 4 shows four exemplary strategies based on product activity and the seller's target recovery relative to an average selling price on a sales channel. The connection provider may recommend a low velocity strategy 410 in a case where the sales channel's ASP is higher than the target recovery price and where the product activity on the sales channel is low. In the low velocity strategy 410 the connection provider may recommend that the items for sale have low start prices (e.g., $1). Low start prices may attract bidders to the item. The strategy 410 may also have a medium listing volume, in which the amount of items for sale are not so low as to only sell a few items on the online sales channel, and not high enough to reduce the ASP. For example, if the listing volume is too low, then some sellers may not recover the costs and fees of selling through an online sales channel. On the other hand, the connection provider may not want some sellers to "flood" the online sales channel with a high listing volume. The connection provider may recommend that some sellers should establish a foothold on the online sales channel first, and then go from a low velocity strategy 410 to a high velocity strategy 420 by using low start prices to increase product activity on the sales channel. The connection provider may also recommend that the items on the online sales channel have a long listing duration (e.g., 7-10 days). The long listing duration can be used to draw more bidders to the item over time, and keep current bidders bidding and counter-bidding longer to increase the ASP.

A connection provider may recommend a low velocity strategy 410 for sellers in which an important factor of selling online is recovering a target price. The seller may be risk adverse in terms of its target recovery, and may not be willing to list a high volume of items where recovery is uncertain and/or where listing a high volume of items can drive down the ASP. In the low velocity strategy case 410, the target price may be derived from a cost of the good (COG) or a MSRP when compared to an alternative sales channels (e.g., a "brick and mortar" store). In selling online, the seller may be primarily concerned with getting a better recovery from the online sales channel than from the alternative sales channel. The item for sale may typically be an "A stock" product (e.g., a product in demand).

A connection provider may recommend a high velocity strategy 420 for sellers in which an important factor of selling online is selling as much of the item as possible at the best available price. In this strategy 420, the seller may be risk tolerant in terms of its recovery. The connection provider may recommend that the items have short listing durations for auctions (e.g., 3-5 days) to move items more quickly than the low velocity strategy 410. In the high velocity strategy 420, the seller's primary concern may be inventory turns. For example, the seller may want to clear out an older generation of items (e.g., VCRs or last season's clothing fashions) for a newer generation of items (e.g., Digital Video Recorders or next season's clothing fashions). The item for sale may typically be a "B stock" product (e.g., a product not in demand). In the high velocity strategy 420, the target price may be derived from a traditional liquation value that may be similar to other forms of sales channels (e.g., liquation prices at "brick and mortar" stores). If the sales channel's ASP is higher than the seller's target price, the seller can increase the listing volume until the ASP is driven down to be at equilibrium with the target price 409. When the ASP is at or just above the target price, a target listing volume has been reached on the sales channel for this strategy 420.

In the high velocity strategy 420 the connection provider may recommend low start prices for auctions for high bidding activity on the sales channel. The connection provider may also recommend a number of different types of auctions, such as fixed-price listings, Dutch, or lot auctions.

In the event that the product activity on the sales channel is low and the sales channel's ASP is lower than the seller's target recovery price, then a "Dog" strategy 430 may be utilized. In a "Dog" strategy 430, the actual recovery (e.g., ASP) from the sales channel is at or below the seller's target recovery. For example, if the seller's target recovery is $20 for an item, the likelihood that highest actual recovery (e.g., ASP) the sales channel can achieve for this strategy 430 is $20. In this case, the items for sale may not list on the online sales channel, but may be sold on another sales channel. The other sales channel may include other online sales channel(s) and/ or another type of sales channel (e.g., catalog sales). Alternatively, the items for sale may have a target price that is set at a fixed price or a price that may be found on another sales channel or established by the item's manufacturer (e.g., MSRP). In this case, the seller may have an online sales channel with low product activity that may serve as a low-cost alternative to the seller's other sales channels.

In the case that the product activity on the sales channel is high and the sales channel's ASP is lower than the seller's target recovery price, a price protection strategy 440 may be utilized in which the seller may be primarily concerned with obtaining the best possible ASP. In an example of a case where the price protection strategy may be used, a seller may want to obtain the best price for a device (e.g., a clock radio, or a cordless telephone) that may be widely available and/or may be of a previous product generation. The connection provider may recommend that the item be sold at a fixed price or at a high start price (e.g., the target recovery price 409). The fixed price or high start price can help to ensure that the ASP is not substantially below the target recovery. The connection provider may also recommend a low listing volume so that ASPs are not driven down with high listing volume. The connection provider may also suggest a long listing duration (e.g., 7-10 days) so that the longer period of time can allow more potential buyers to bid on the items.

The strategies shown in FIG. 4 may also be utilized for "second chance" offers. A "second chance" offer can allow sellers to extend an offer to underbidders for a completed auction at their highest bid. The sellers may use a second chance offer, for example, in the following situations: when the original winning bidder of an item fails to complete the purchase; when the seller has duplicate items in stock; and/or when an item listing closes short of the reserve price (e.g., auction price too low to reserve the item). Second chance offers can be created immediately after an auction ends, as well as for a certain time period afterwards (e.g., up to 60 Days afterwards).

Second chance offers can be beneficial in offering sales services at low costs and improving the bottom-line sales results of the seller. Providing second chance offers can also be efficient in that the online sales channel already has most, if not all, of the information from both the buyer and the seller (e.g., item description, pictures, and contact information). In another benefit, the seller has an audience that is already interested in purchasing the item. The seller can increase sales of other similar items by re-offering the item for sale before the potential buyer begins to shop for the item at other sales channels.

Second chance offers may be implemented automatically, with the seller sending a second chance offer price, and all of the other information for selling the item, in the PDF to the connection provider. The second chance offer may have a default price at or above the target recovery. When an item is purchased by the highest bidder, one or more underbidders may be automatically provided with a second chance offer (e.g., via an email with a link to a similar item). In some cases, second chance offers may be provided only to the highest underbidders for an item, and may only be provided for sellers with multiple item listings.

Using the high velocity strategy 420, for instance, prices for items can be started at a low start price with a goal of having high bidding activity to drive the ASP to around the seller's target price. An auction using this strategy 420 can yield multiple underbidders who bid above the target price. The online sales channel and/or the seller can solicit these underbidders as candidates for second chance offers.

Using the price protection strategy 440, for example, the ASP of listed items may not perform well in an auction when compared to the seller's target recovery 409. However, the listed items may still be in high demand, and may be sold in a second chance offer. If there are multiple listings for the item, the seller could lower the listing volume to increase the ASP to or above the target recovery 409. The seller can send second chance offers to the underbidders to allow them bid on the item. With the ASP increased to around the target recovery, the seller can expect an ASP of the second chance offers to be in a similar range as the sold item. The connection provider can selectively fine-tune strategy for various merchants depending on the performance of the sales.

The connection provider may provide one or more services for merchants based on the performance of the sales of items. The performance can be categorized into "buckets" for each merchant, and may provide additional auction analysis. The "bucket" category for a merchant can depend on the conversion rate of the auction items, and the sales performance of the items, in which the sales performance is based on the target recovery price. The performance can be measured by the feedback from the merchant's sales channels. The feedback may include customer feedback, and/or may include sales performance (e.g., how well items are selling on that sales channel). The feedback may vary with one or more of the parameters shown in FIGS. 3A and 3B, and may adjust the target price as discussed in relation to FIG. 4.

An example of a bucket may include a "high performance, ample inventory" bucket, in which a criteria for this bucket includes a listing conversion rate on auctions of over 60%. The "high performance, amply inventory" bucket may include 3 auctions starting per day, with 3 day listings for each auction. The BIN may be at the target price, and the auction start price may be equal to the target recovery price minus $0.50. The "high performance, amply inventory" bucket may also include multiple quantities of an item at a fixed price, with a 10-day, full-featured listing.

Other types of buckets (e.g., "medium performance, ample inventory" ) may include various performance levels (e.g., high, medium, low, and poor performance), and various listing inventory levels (e.g., limited or ample inventory). In addition to sales performance, another criterion for the merchant to be placed in a certain sales bucket is the conversion rate on auctions (e.g., 40%-70% conversion rate for a "low performance" bucket). The bucket classification for a merchant may vary depending on the sales performance and/or the conversion rate of the items for sale.

Figure 5:
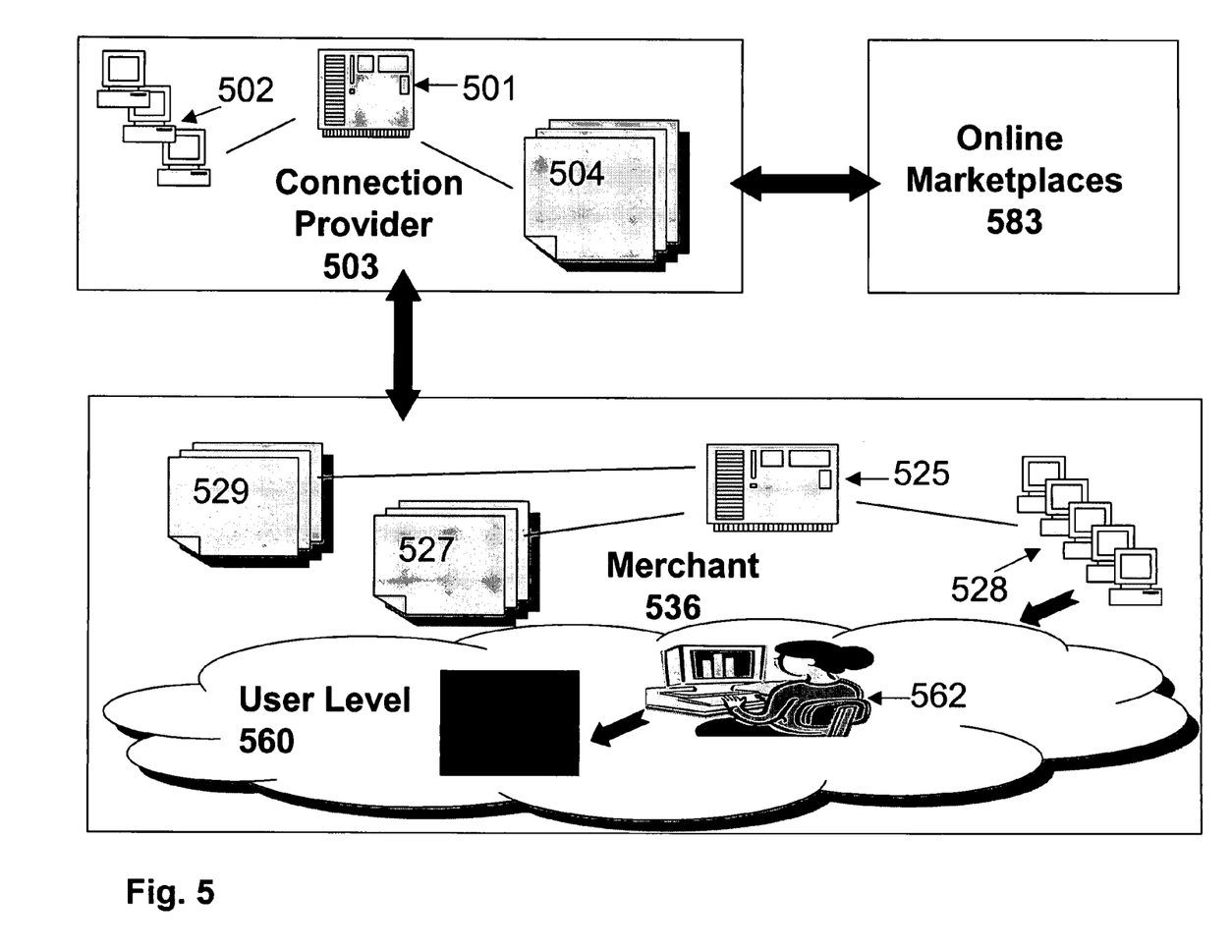
FIG. 5 is a block diagram of a computer system architecture.

FIG. 5 shows an exemplary architectural block diagram of a connection system. The seller or merchant 536 may employ one or more computer system users 562 to enter information for one or more items for sale in a graphical user interface 561. The merchant's computer system may have a repository or database 525 with files, objects, and documents 527, 529 with information describing the merchant's items, businesses, financial information, human resource information, etc. Typically, the information describing the merchant's items for sale is recorded and maintained at the level of the SKU. The merchant's information may be accessed in a network of computers 528. The merchant's system may also be on a physically distributed system, in which information may reside on one or more computers 528 and databases 525, and may be accessed by one or more users 562. The merchant 536 may transmit a PDF with item and sales information to a connection provider 503, which can use the information to list the items for sale on one or more online marketplaces 583. In general, the information transmitted to and received from the connection provider 503 may include one or more of the following: business-specific information, such as sales and customer information; data within objects, spreadsheets, and text files; and business-related applications and logic.

The information generated from the merchant 536 may be generated by a program or an automated process that may not require a user 562 or a corresponding graphical user interface 561. For instance, the merchant 536 may have a program to automatically generate results for certain data fields of the PDF table (e.g., quantities for sale, starting auction prices, merchant preferences for a particular online sales channel). In some cases, the automatically-generated data fields may relate more to the seller rather than to the item being sold (e.g., shipping information and policies, item return information, merchant contact information). The automation and standardization features of the PDF can simplify the merchant's task of submitting detailed item information for a number of items.

On the connection provider's side, the connection provider can use the standardized features of the PDF to automate validation and processing of data entries. The amount of data entries provided in the PDF may be scalable and based on the number of items sold and/or the listing details of the items. Due to the nature of the PDF's scalability, standardization, and automation in processing, the connection provider can provide detailed and organized item information from one or more merchants to one or more online sales channels expeditiously.

At a basic level, the connection provider 503 offers connection services between one or more merchants 536 and one or more online marketplaces 583. The connection provider may have a computer system architecture that includes objects, documents 504 and information residing on one or more repositories or databases 501. The information may be networked among multiple computers 502. The connection provider 503 may or may not share hardware resources with the online marketplaces 583.

The connection provider 503 may also receive information from multiple sellers (not shown) regarding the items they are selling. The connection provider 503 can facilitate a sale of the items through one or more online sales channels 583. The items may sell at different times and in different quantities and may sell to different customers on several online sales channels.

As used herein, the terms "electronic document" and "document" mean a set of electronic data, including both electronic data stored in a file and electronic data received over a network. An electronic document does not necessarily, but may, correspond to a file. A document may be stored in a portion of a file that holds other documents, in a single file dedicated to the document in question, or in a set of coordinated files. The term "object" may refer to information sources such as documents, reports, presentations, files and directories.

The disclosed software, techniques, and systems described herein may use software and structures available from the connection provider. Instead of or in addition to software and systems supplied by the connection provider, the disclosed software and systems may coexist or operate with software and systems provided by third parties.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), a wireless local area network ("WLAN"), a personal area network ("PAN"), a mobile communication network using a multiple access technology (e.g., a cellular phone network with Code Division Multiple Access, "CDMA"), and the Internet.

The computing system can include clients (FIG. 5) and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. Nevertheless, it will be understood that various modifications may be made without departing from the spirit and scope of the claims below. For example, the auction factors listed in FIGS. 3A-3B may include other parameters for specific merchants and/or items. The user interfaces described above may be referred to as panels, palettes, pages, views, or portions of other interfaces. The strategies depicted in FIG. 4 may include other strategies not shown, like a strategy for selling items in limited quantities (e.g., antiques). Other implementations may be described so that the connection provider can provide enhanced value to sellers (e.g., via providing the seller with a personal auction strategy consultant). The connection provider may send the PDF along with other information (e.g., rules and regulations for selling items online, frequently asked questions—FAQs, user guides and step-by-step instructions for completing and returning the PDF). Accordingly, other implementations are within the scope of the following claims.

What is claimed is:

1. A computer-implemented method comprising:

providing a secure portal interface for allowing a third party to provide a description and a target price of items to be sold;

using an auction strategist module to automatically select, from among multiple auction strategies identified in a database stored on a machine-readable device, a specific recommended auction strategy based on the description, the target price, and an identity of the third party;

selecting, from among multiple online sales channels identified in the database, a sales channel based on the recommended auction strategy;

facilitating a sale of one or more of the items using the recommended auction strategy, based on providing access to the selected sales channel by the third party;

using the auction strategist module to perform an analysis of a sales performance of the one or more of the items being sold using the recommended auction strategy;

altering the recommended auction strategy of the one or more of the items being sold, based on the analysis; and facilitating fulfillment of the items sold using the recommended auction strategy or the altered auction strategy, wherein altering the recommended auction strategy further comprises:

detecting completion of an auction in which a winning bidder is determined to have provided a highest bid for one or more items included in the auction and for which a duration of the auction has ended;

after detecting completion of the auction, determining whether a second chance offer opportunity exists; and in response to a determination that a second chance offer opportunity exists:

identifying at least one underbidder in the auction that provided a bid for the one or more items included in the auction that was lower than the highest bid provided by the winning bidder, and automatically sending a second chance offer that is based on the one or more items included in the auction to the identified at least one underbidder;

wherein selecting the recommended auction strategy further comprises at least one of:

automatically suggesting a specific recommended auction duration period, automatically suggesting a specific recommended starting price for the one or more items, automatically suggesting recommended auction starting and ending times, automatically suggesting a specific recommended auction type, from among Dutch, Chinese, Buy-It-Now, large lot, and fixed price auction types, and automatically selecting between a low velocity strategy in which items are sold at a relatively slow rate and a high velocity strategy in which items are sold at a relatively fast rate based on the third party's level of risk tolerance in recovering a target price set by the third party for items sold;

wherein facilitating the sale of the one or more of the items further comprises at least one of:

augmenting the description of the one or more of the items on the selected sales channel with description information not provided by the user, and grouping the one or more items into a category associated with the selected online sales channel; and wherein performing the analysis further comprises at least one of:

comparing the target price to an average selling price associated with the one or more of the items, and determining how quickly the one or more items were sold on the selected sales channel, from when the one or more items were first listed.

2. The method of claim 1, wherein the description and the target price of the items to be sold are provided by the third party in a eXtensible Markup Language (XML) data file.

3. The method of claim 1, wherein selecting the recommended auction strategy further comprises automatically suggesting a specific recommended auction duration period.

4. The method of claim 1, wherein selecting the recommended auction strategy further comprises automatically suggesting a specific recommended starting price for the one or more items.

5. The method of claim 1, wherein selecting the recommended auction strategy further comprises automatically suggesting recommended auction starting and ending times.

6. The method of claim 1, wherein selecting the recommended auction strategy further comprises automatically suggesting a specific recommended auction type, from among Dutch, Chinese, Buy-It-Now, large lot, and fixed price auction types.

7. The method of claim 1, wherein facilitating the sale of the one or more of the items further comprises augmenting the description of the one or more of the items on the selected sales channel with description information not provided by the user.

8. The method of claim 1, wherein facilitating the sale of the one or more of the items further comprises grouping the one or more items into a category associated with the selected online sales channel.

9. The method of claim 1, wherein performing the analysis further comprises comparing the target price to an average selling price associated with the one or more of the items.

10. The method of claim 1, wherein performing the analysis further comprises determining how quickly the one or more items were sold on the selected sales channel, from when the one or more items were first listed.

11. The method of claim 1 wherein using the auction strategist module to automatically select, from among multiple auction strategies identified in the database stored on the machine-readable device, the specific recommended auction strategy based on the description, the target price, and the identity of the third party comprises using the auction strategist module to automatically select between a low velocity strategy in which items are sold at a relatively slow rate and a high velocity strategy in which items are sold at a relatively fast rate based on the third party's level of risk tolerance in recovering a target price set by the third party for items sold.

12. A computer-readable medium encoded with a computer program comprising instructions that, when executed, cause a computer to perform operations comprising:

providing a secure portal interface for allowing a third party to provide a description and a target price of items to be sold;

using an auction strategist module to automatically select, from among multiple auction strategies identified in a database, a specific recommended auction strategy based on the description, the target price, and an identity of the third party;

selecting, from among multiple online sales channels identified in the database, a sales channel based on the recommended auction strategy;

facilitating a sale of one or more of the items using the recommended auction strategy, based on providing access to the selected sales channel by the third party;

using the auction strategist module to perform an analysis of a sales performance of the one or more of the items being sold using the recommended auction strategy;

altering the recommended auction strategy of the one or more of the items being sold, based on the analysis; and facilitating fulfillment of the items sold using the recommended auction strategy or the altered auction strategy, wherein altering the recommended auction strategy further comprises:

detecting completion of an auction in which a winning bidder is determined to have provided a highest bid for one or more items included in the auction and for which a duration of the auction has ended;

after detecting completion of the auction, determining whether a second chance offer opportunity exists; and     in response to a determination that a second chance offer opportunity exists:

identifying at least one underbidder in the auction that provided a bid for the one or more items included in the auction that was lower than the highest bid provided by the winning bidder, and         automatically sending a second chance offer that is based on the one or more items included in the auction to the identified at least one underbidder;

wherein selecting the recommended auction strategy further comprises at least one of:

automatically suggesting a specific recommended auction duration period,     automatically suggesting a specific recommended starting price for the one or more items,     automatically suggesting recommended auction starting and ending times,     automatically suggesting a specific recommended auction type, from among Dutch, Chinese, Buy-It-Now, large lot, and fixed price auction types, and     automatically selecting between a low velocity strategy in which items are sold at a relatively slow rate and a high velocity strategy in which items are sold at a relatively fast rate based on the third party's level of risk tolerance in recovering a target price set by the third party for items sold;

wherein facilitating the sale of the one or more of the items further comprises at least one of:

augmenting the description of the one or more of the items on the selected sales channel with description information not provided by the user, and     grouping the one or more items into a category associated with the selected online sales channel; and wherein performing the analysis further comprises at least one of:

comparing the target price to an average selling price associated with the one or more of the items, and     determining how quickly the one or more items were sold on the selected sales channel, from when the one or more items were first listed.

13. The computer-readable medium of claim 12, wherein selecting the recommended auction strategy further comprises automatically suggesting a specific recommended auction duration period.

14. The computer-readable medium of claim 12, wherein selecting the recommended auction strategy further comprises automatically suggesting a specific recommended starting price for the one or more items.

15. The computer-readable medium of claim 12, wherein selecting the recommended auction strategy further comprises automatically suggesting recommended auction starting and ending times.

16. The computer-readable medium of claim 12, wherein selecting the recommended auction strategy further comprises automatically suggesting a specific recommended auction type, from among Dutch, Chinese, Buy-It-Now, large lot, and fixed price auction types.

17. The computer-readable medium of claim 12, wherein facilitating the sale of the one or more of the items further comprises augmenting the description of the one or more of the items on the selected sales channel with description information not provided by the user.

18. The computer-readable medium of claim 12, wherein facilitating the sale of the one or more of the items further comprises grouping the one or more items into a category associated with the selected online sales channel.

19. The computer-readable medium of claim 12, wherein performing the analysis further comprises comparing the target price to an average selling price associated with the one or more of the items.

20. The computer-readable medium of claim 12, wherein performing the analysis further comprises determining how quickly the one or more items were sold on the selected sales channel, from when the one or more items were first listed.

21. A device comprising:

a database configured to store information identifying multiple online sales channels and multiple auction strategies;

a secure portal interface configured to allow a third party to provide a description and a target price of items to be sold;

an auction strategist module configured to:

automatically select, from among the multiple auction strategies, a specific recommended auction strategy based on the description, the target price, and an identity of the third party, and         perform an analysis of a sales performance of the one or more of the items being sold using the recommended auction strategy; and     a connection provider configured to:

select, from among the multiple online sales channels, a sales channel based on the recommended auction strategy,         facilitate a sale of one or more of the items using the recommended auction strategy, based on providing access to the selected sales channel by the third party,         alter the recommended auction strategy of the one or more of the items being sold, based on the analysis, and         facilitate fulfillment of the items sold using the recommended auction strategy or the altered auction strategy,     wherein the auction strategist module is configured to alter the recommended auction strategy by:

detecting completion of an auction in which a winning bidder is determined to have provided a highest bid for one or more items included in the auction and for which a duration of the auction has ended;

after detecting completion of the auction, determining whether a second chance offer opportunity exists; and         in response to a determination that a second chance offer opportunity exists:

identifying at least one underbidder in the auction that provided a bid for the one or more items included in the auction that was lower than the highest bid provided by the winning bidder, and automatically sending a second chance offer that is based on the one or more items included in the auction to the identified at least one underbidder;

wherein selecting the recommended auction strategy further comprises at least one of:

automatically suggesting a specific recommended auction duration period, automatically suggesting a specific recommended starting price for the one or more items, automatically suggesting recommended auction starting and ending times, automatically suggesting a specific recommended auction type, from among Dutch, Chinese, Buy-It-Now, large lot, and fixed price auction types, and automatically selecting between a low velocity strategy in which items are sold at a relatively slow rate and a high velocity strategy in which items are sold at a relatively fast rate based on the third party's level of risk tolerance in recovering a target price set by the third party for items sold;

wherein facilitating the sale of the one or more of the items further comprises at least one of:

augmenting the description of the one or more of the items on the selected sales channel with description information not provided by the user, and grouping the one or more items into a category associated with the selected online sales channel; and wherein performing the analysis further comprises at least one of:

comparing the target price to an average selling price associated with the one or more of the items, and determining how quickly the one or more items were sold on the selected sales channel, from when the one or more items were first listed.

22. The device of claim 21, wherein selecting the recommended auction strategy further comprises automatically suggesting a specific recommended auction duration period.

23. The device of claim 21, wherein selecting the recommended auction strategy further comprises automatically suggesting a specific recommended starting price for the one or more items.

24. The device of claim 21, wherein selecting the recommended auction strategy further comprises automatically suggesting recommended auction starting and ending times.

25. The device of claim 21, wherein selecting the recommended auction strategy further comprises automatically suggesting a specific recommended auction type, from among Dutch, Chinese, Buy-It-Now, large lot, and fixed price auction types.

26. A computer-implemented method comprising:

providing a secure portal interface for allowing a third party to provide a description and a target price of items to be sold;

using an auction strategist module to automatically select, from among multiple auction strategies identified in a database stored on a machine-readable device, a specific recommended auction strategy based on the description, the target price, and an identity of the third party;

selecting, from among multiple online sales channels identified in the database, a sales channel based on the recommended auction strategy;

facilitating a sale of one or more of the items using the recommended auction strategy, based on providing access to the selected sales channel by the third party;

using the auction strategist module to perform an analysis of a sales performance of the one or more of the items being sold using the recommended auction strategy;

altering the recommended auction strategy of the one or more of the items being sold, based on the analysis; and facilitating fulfillment of the items sold using the recommended auction strategy or the altered auction strategy, wherein altering the recommended auction strategy further comprises:

detecting completion of an auction in which a winning bidder is determined to have provided a highest bid for one or more items included in the auction and for which a duration of the auction has ended;

after detecting completion of the auction, determining whether a second chance offer opportunity exists; and in response to a determination that a second chance offer opportunity exists:

identifying at least one underbidder in the auction that provided a bid for the one or more items included in the auction that was lower than the highest bid provided by the winning bidder, and automatically sending a second chance offer that is based on the one or more items included in the auction to the identified at least one underbidder; and wherein determining whether a second chance offer opportunity exists comprises determining that a second chance offer opportunity exists when the winning bidder of the auction fails to complete a purchase based on the auction, when the third party has duplicates of the one or more items included in the auction in stock, or when the highest bid is lower than a reserve price set for the auction.

27. A computer-readable medium encoded with a computer program comprising instructions that, when executed, cause a computer to perform operations comprising:

providing a secure portal interface for allowing a third party to provide a description and a target price of items to be sold;

using an auction strategist module to automatically select, from among multiple auction strategies identified in a database stored on a machine-readable device, a specific recommended auction strategy based on the description, the target price, and an identity of the third party;

selecting, from among multiple online sales channels identified in the database, a sales channel based on the recommended auction strategy;

facilitating a sale of one or more of the items using the recommended auction strategy, based on providing access to the selected sales channel by the third party;

using the auction strategist module to perform an analysis of a sales performance of the one or more of the items being sold using the recommended auction strategy;

altering the recommended auction strategy of the one or more of the items being sold, based on the analysis; and facilitating fulfillment of the items sold using the recommended auction strategy or the altered auction strategy, wherein altering the recommended auction strategy further comprises:
  detecting completion of an auction in which a winning bidder is determined to have provided a highest bid for one or more items included in the auction and for which a duration of the auction has ended;
  after detecting completion of the auction, determining whether a second chance offer opportunity exists; and
  in response to a determination that a second chance offer opportunity exists:
    identifying at least one underbidder in the auction that provided a bid for the one or more items included in the auction that was lower than the highest bid provided by the winning bidder, and
    automatically sending a second chance offer that is based on the one or more items included in the auction to the identified at least one underbidder; and
  wherein determining whether a second chance offer opportunity exists comprises determining that a second chance offer opportunity exists when the winning bidder of the auction fails to complete a purchase based on the auction, when the third party has duplicates of the one or more items included in the auction in stock, or when the highest bid is lower than a reserve price set for the auction.

* * * * *

UNITED STATES PATENT AND TRADEMARK OFFICE
CERTIFICATE OF CORRECTION

PATENT NO.        : 7,769,640 B2                                               Page 1 of 1
APPLICATION NO.   : 10/794583
DATED             : August 3, 2010
INVENTOR(S)       : Greg Klenske It is certified that error appears in the above-identified patent and that said Letters Patent is hereby corrected as shown below:

Title page item (73), Assignee, line 2 delete "Schaffausen" and insert -- Schaffhausen --, therefor.

Signed and Sealed this

Thirtieth Day of November, 2010

David J. Kappos
*Director of the United States Patent and Trademark Office*